Figure 1:
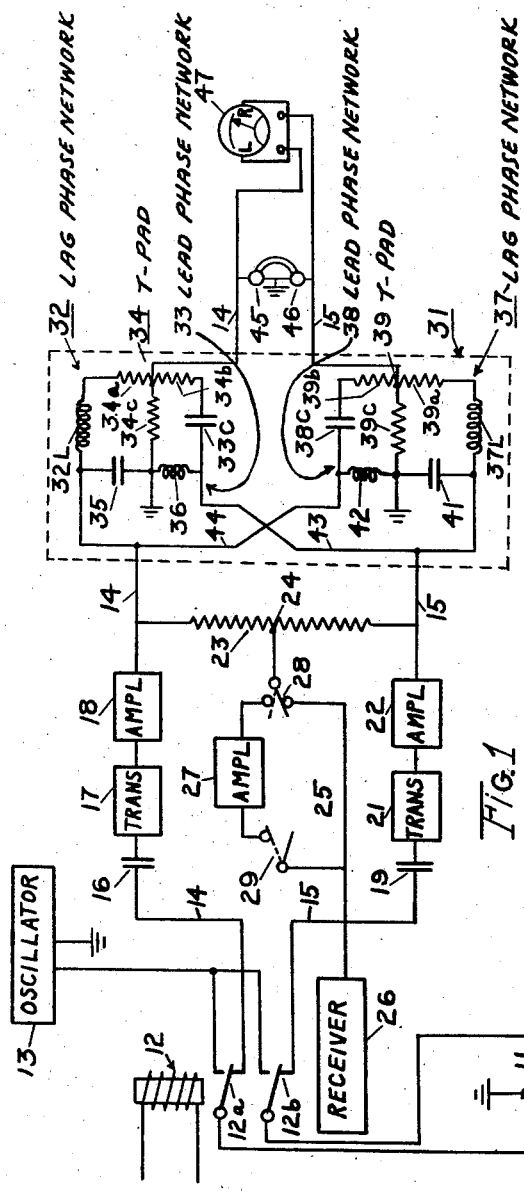

Jan. 6, 1948.    M. H. HEBB    2,433,991
LAG-LEAD LINE FOR BEARING DEVIATION INDICATORS
Filed June 10, 1944

Inventor
MALCOLM H. HEBB
By
Attorney

Patented Jan. 6, 1948

2,433,991

UNITED STATES PATENT OFFICE 2,433,991

LAG-LEAD LINE FOR BEARING DEVIATION INDICATORS

Malcolm H. Hebb, Cambridge, Mass., assignor to the United States of America, as represented by the Secretary of the Navy Application June 10, 1944, Serial No. 539,730

5 Claims. (Cl. 177—386)

This invention relates to apparatus for determining the direction of origin of radiated energy and is particularly directed, although not limited, to the determination of the direction of a source of compressional wave energy either arising directly or as an echo of a transmitted sound.

This invention is of especial utility in underwater sound echo ranging and is described in this connection in the following specification. However, it should be expressly understood that it is equally applicable in conjunction with other forms of wave energy.

More particularly, the invention is directed to an improvement in the phase shifting means disclosed in application Serial No. 531,490, filed April 17, 1944.

In the system shown in the aforesaid application, use is made of a phase shifting device which may be either a lag or lead network. The function of the network is to establish electrically and simultaneously a plurality of overlapped directional lobes of sensitivity in an array of wave receiving elements, in which each lobe's direction is determined by the combined response of more than one element of the array.

Specifically, the system utilizes a two-part electrosonic transducer which has a direction sensitive intensity pattern, the main lobe of which is normally perpendicular to the active face of the transducer. The phase shifting network, which is a single $\pi$ section lag line, is connected across the leads from the two parts of the transducer to form two output channels. Hence, a direct, unshifted output from each part of the transducer combines with the output from the other part that is shifted in phase by passing through the network to form two separate output circuits which are electrically equivalent to two separate transducers with their major sensitivity lobes overlapped.

In operation, intermittent pulses of sound energy are projected from the transducer and the latter is trained slowly around the underwater horizon until an echo is picked up from an underwater target. If the intensity of the echo signal in both output circuits is the same, the operator will know that the transducer is trained accurately on the exact bearing on which the target lies with respect to the ship carrying the transducer. If there is a difference in intensity level between the echo signals in the output circuits, the operator will know that he is off the target. He then adjusts the angle of train of the transducer slightly so as to bring both echo signals to the same intensity level.

In the system just described, the electrical phase shift required in combining the output of the two parts of the transducer into either output circuit, or channel, is independent of frequency and size of the transducer. The reason for this is that the required deviation of the two sensitivity lobes or beams is a fairly definite fraction of their own width. The phase shift most commonly used is about 60° although the actual optimum value probably depends on the stiffness of the front plate of the transducer covering the active elements thereof which introduces mechanical coupling between the transducer's sides and so reduces the effective phase difference.

However, with the use of a single $\pi$ section lag line, as in the aforesaid application, or a similarly constructed lead line, the phase shift changes with frequency and will be the desired amount, such as, for example, 60°, only at the one frequency for which the line has been designed.

Now this is a undesirable condition for many reasons and it is therefore the general object of this invention to provide a novel phase shifting network section in which the amount of the shift is independent of changes in frequencies within a given band and therefore remains constant over such band.

The advantages in my novel network are many. It can be used at any frequency within its range and thus allows the same network to be installed with the equipment to work at any such frequency. This function is desirable since different echo ranging equipments will be found to be designed to work at slightly different frequencies within the same general supersonic frequency range. Furthermore, this novel network can be used for the reception of noise in a rather wide band which is desirable since there are some advantages in regard to pattern in using a wide band rather than a narrow one in the reception of noise. Also, my novel network can be used quite well in echo ranging equipment employing crystal types of transducers which allow the operator to select his own frequency of sound transmission within a certain frequency band.

If the phase constant of the network is $\beta$, one has the formulas:

(1)      Lag line: $\cos \beta = 1 - 2(f/f_c)^2$ (2)      Lead line: $\cos \beta = 1 - 2(f_c/f)^2$ where $f_c$ is the cut-off frequency of the network and $\beta$ is positive for the lead line and negative for the lag line. If the network is to produce a phase difference of 60°, we must have $f = f_c/2$ in Equation 1, or $f = 2f_c$ in Equation 2.

For any network, the phase constant of the band pass therein, without dissipation, must satisfy the equation:

(3) $$d\beta/df > 0$$

It can be verified that Equations 1 and 2 satisfy this condition. While Equation 3 does not preclude the possibility of construction a single section $\pi$ network whose phase constant is nearly invariable over a certain range in frequency, such a network would be exceedingly complicated and costly.

According to this invention, instead of passing the output from one half of the transducer through the network and combining it with the unshifted output from the other transducer half, as is done in the aforesaid application, I pass the output from each transducer half through a lag section and combine it with an output from the other transducer half after being passed through a lead section to thereby form the two output circuits, or channels, the relative signal intensities of which are then compared.

According to Equations 1 and 2, the lag of the lag section increases with increasing frequency and the lead (negative phase constant) of the lead section decreases with increasing frequency. Consequently, the change in phase constant with frequency in the lag and lead sections tends to compensate one another and the phase difference between the two signals in the output channels will be made stationary in the vicinity of a particular frequency.

Figure 2:
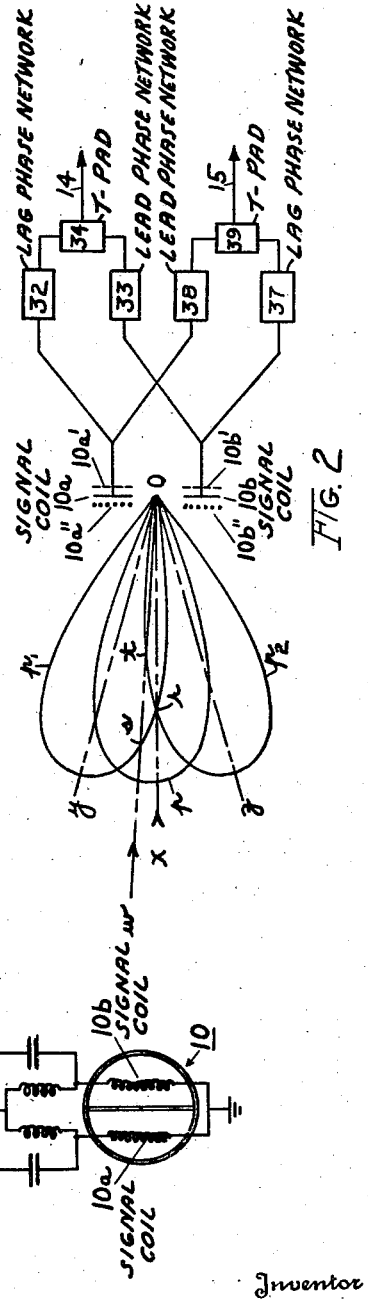

In the drawings, Fig. 1 is a schematic view of a preferred embodiment of the invention, and Fig. 2 is a condensed schematic view of the apparatus shown in Fig. 1 and also showing the simultaneously overlapped intensity patterns which are obtained by the arrangement shown in Fig. 1.

Referring now to the drawings, a transducer disposed beneath the surface of the water is shown at 10. The transducer illustrated is of the magnetostrictive type and of conventional construction. However, the electrical connections from the elements comprising the left half 10a and those comprising the right half 10b, representing the signal current coils of the right and left hand magnetostrictive transducer elements respectively, are brought out separately.

For polarizing the elements of transducer 10, a D. C. generator 11 may be utilized. One side of the output of generator 11 is grounded and the other side connected to the left and right transducer halves in parallel.

A relay 12, the winding of which is adapted to be energized intermittently from a suitable source of power through any well known timing means (not shown), functions when energized to momentarily connect the output from transmitter oscillator 13, at supersonic frequency through its contacts 12a, 12b to the transducer halves 10a and 10b. The electrical energy thus imparted simultaneously to the transducer elements of both halves of transducer 10, which is a pulse of very short duration, causes a pulse of compressional wave energy to be projected through the water.

The dimensions of transducer 10 relative to the frequency of the output of oscillator 13 are such that most of the energy is projected normal to the active face of transducer 10 along axis O$x$, see Fig. 2, and its transmitting pattern has a major lobe such as pattern $p$ in Fig. 2 with its maximum along the axis O$x$.

After the pulse of wave energy is projected, contacts 12a, 12b of relay 12 open to connect the transducer halves 10a, 10b to separate output channels 14, 15.

Should the projected pulse strike an underwater target and be reflected, the pulse echo will return to the face of the transducer, the latter now being connected to act as an energy receiver, and mechanically excite the transducer elements thereby generating electromotive forces therein. The voltage output from the elements in transducer half 10a feed into output channel 14, and the output from the elements of transducer half 10b into channel 15.

The output voltage in channel 14, which should be equal, or nearly so, to the output voltage in channel 15, feeds through capacitor 16 into input transformer 17 which is tuned to the output voltage frequency and thence through amplifier 18. Similarly, the output voltage in channel 15, feeds through capacitor 19 into input transformer 21 and thence through amplifier 22.

If desired, a resistor 23 may be connected across channels 14, 15 at the output terminals of amplifiers 18 and 22. This resistor is center tapped at 24 to obtain an output which is drawn alike from both transducer halves 10a, 10b and this output therefore corresponds to directional pattern $p$ in Fig. 2 with its axis O$x$ perpendicular to the face of the transducer. Accordingly, this output feeds over conductor 25 to an aural and/or visual receiver 26. Receiver 26 should have a properly matching impedance. If it does not, it may be necessary to interpose an amplifier 27 properly designed for the impedance on both its input and output sides. Amplifier 27, if used, may be connected by throwing switches 28, 29 from the position shown to the broken line position.

It should be noted here that the oscillator 13, input transformers 17 and 21, amplifiers 18, 22 and 27, and receiver 26, are of conventional construction and have therefore been illustrated in block form only.

My novel and improved phase shifting network 31 is enclosed by the block formed with broken lines. For convenience in description, network 31 may be considered as being divided into upper and lower parts.

The upper part comprises a lag section 32 which includes a series inductance 32L and shunt capacitor 35. Cooperating with lag section 32 is a lead section 33 which includes a series capacitor 33C and shunt inductance 36. The lag and lead sections 32 and 33 are connected into the ends of a T-pad 34 comprising resistors 34a, 34b, and 34c.

The lower part of the network comprises a lag section 37 which includes series inductance 37L and an associated shunt capacitor 41, while the corresponding lead section 38 here includes series capacitor 38c and shunt inductance 42. The T-pad 39 to which lag section 37 and lead section 38 are connected consists of resistors 39a, 39b and 39c.

As described herein, a lag section includes a single series inductance and an associated shunt capacitor. However, it may be advantageous to use a plurality of similarly constituted sections, that is a number of series inductances and a number of shunt capacitors to produce a network which may more accurately fulfill its purpose. To facilitate description of the present invention, however, a single section is shown. The same considerations hold, of course, for the lead sections.

The echo output signal from the output of amplifier 18 in channel 14 feeds through lag section 32 and resistor 34a into the center of pad 34. Hence, the echo signal component on the right or output side of pad 34 will lag as compared to the signal at the output of amplifier 18 and makes transducer half 10a operate virtually as if it were to be set back to the broken line position 10a' in Fig. 2. Also, the echo signal on the output side of amplifier 22 in channel 15, feeds over conductor 43 through lead section 33 and resistor 34b into the center of pad 34. Hence, this component of the echo signal on the output side of pad 34 will lead as compared to the signal at the output of amplifier 22 and makes transducer half 10b operate virtually as if it were to be set forward to the dotted line position 10b'' in Fig. 2.

This virtual setting back of transducer half 10a and similar setting forward of transducer half 10b shifts the axis of the main lobe of the sensitivity pattern to Oy, the main lobe now being designated by "$p_1$."

In a similar manner, the echo signal from the output of amplifier 22 in channel 15 feeds through lag section 37 and resistor 39a into the center of pad 39. Hence, the echo signal component on the output side of pad 39 will lag as compared to the signal at the output of amplifier 22 and makes transducer half 10b operate virtually as if it were to be set back to the broken line position 10b' in Fig. 2. Also, the echo signal on the output side of amplifier 18 in channel 14 feeds over conductor 44 through lead section 38 and resistor 39b into the center of pad 39. Hence, this component of the echo signal at the output of pad 39 will lead as compared to the signal at the output of amplifier 18 and makes transducer half 10a operate virtually as if it were to be set forward to the dotted line position 10a'' in Fig. 2.

This virtual setting back of transducer half 10b and similar setting forward of transducer half 10a shifts the axis of the main lobe of the sensitivity pattern to Oz, the main lobe now being designated by "$p_2$."

It should be noted that besides the lagging and leading components of the echo signal to channels 14 and 15 at the outputs of pads 34 and 39, it would be possible, for example, for an "indirect" signal component to get to the output of pad 34 from channel 15 over the path including inductance 37L, resistors 39a and 39b, capacitor 38C, conductor 44, inductance 32L, and resistor 34a. However, with T-pads 34 and 39, such "indirect" signals must hence pass through three capacitors and inductances from channels 14 or 15 to reach the output side of pad 34 or 39, while the "direct" signals must pass through only one lead or lag section from channels 14 and 15. Thus the "indirect" signals are satisfactorily attenuated.

With the overlapped intensity patterns described, the echo signal output in each of the two channels 14, 15 at the output sides of pads 34 and 39 will accordingly vary with the direction of the echo pulse relative to the mid-plane of the face of the transducer 10. If the echo pulse returns to the face of the transducer along axis Ox, it is seen from the patterns in Fig. 2 that the amplitude of the echo pulse in both channels 14 and 15 will be equal, being represented by the vector Or. However, if the echo pulse returns along some other axis such as Ow, its amplitude in the channel represented by pattern $p_1$ will be at a level indicated by vector Os while its amplitude in the channel represented by pattern $p_2$ will be at a level indicated by vector Ot. A comparison of the relative amplitudes of the outputs in channels 14 and 15 therefore indicates whether the echo pulse is returning to the transducer face from the left or from the right of the perpendicular thereto, or along the perpendicular. Of course, in actual operation, once an underwater target has been picked up, the operator endeavors so to train his transducer that the signal amplitudes in both output channels 14, 15 are always equal, in which event, the bearing of the target is along axis Ox, normal to the face of transducer 10.

The comparison of the outputs in the two channels 14, 15 representing the two directivities of the transducer elements is made in the aforesaid application by circuit means including an oscilloscope, which for simplification, have not been repeated in this application. In lieu thereof, more simple comparison means such as receivers 45, 46 are shown by which the comparison may be made binaurally. If visual comparison is desired, a left-right indicator 47 of conventional design may be used.

It will now be evident that the results obtained by the novel phase shifting network of this invention produce substantially the same results as shown in the aforesaid application. However, in addition, this novel network, as compared to the single π section network shown in the aforesaid application, will permit a shift in frequency without adverse effects since any change in phase constant of a lag section is offset by a substantially equal and corrective change in phase constant of its companion lead section.

The novel network described herein may also be used for "listening," i. e., to receive wave energy that may be emitted directly from a source such as, for example, the propeller noise of a submarine, as distinguished from an echo of a pulse projected from transducer 10. For this function, the network would necessarily be installed in place of the network shown in the aforesaid application and the characteristic of the noise studied on the screen of the oscilloscope shown in that application.

It should be expressly understood that the foregoing description concerns the preferred embodiments of the invention and that numerous changes may be made therein without departing from the spirit and scope of the invention as defined in the appended claims.

Further, while it is preferred to use a single transducer structure in which the elements are divided into a plurality of sections, it is evident that substantially the same result may be obtained with the use of separate transducers placed close enough so that overlapping directivity patterns may be created.

As used herein, the term "transducer" is intended to include any device capable of translating wave energy, either sonic or radiant, to electrical energy and vice versa.

Having thus fully described my invention, I claim:

1. Apparatus for determining the direction of a source of wave energy comprising a plurality of elements constituting an array capable of translating received energy into electrical energy, circuit means connecting said elements into at least two output groups, phase shifting means including lag and lead sections connected in circuit with each group, circuit means combining an output through a lead section of a first one of said groups with an output through a lag section of a second one of said groups, circuit means combining an output through a lag section of said first group with an output through a lead section of said second group, to thereby derive a plurality of output channels each representing a different directivity of said array, and means for comparing the outputs in said channels.

2. Apparatus for determining the direction of a source of compressional wave energy comprising an electro-sonic transducer, circuit means grouping the elements of said transducer into at least two output groups, phase shifting means including lag and lead sections connected in circuit with each group, circuit means combining an output through a lead section of a first one of said groups with an output through a lag section of a second one of said groups, circuit means combining an output through a lag section of said first group with an output through a lead section of said second group, to thereby derive a plurality of output channels each representing a different directivity of the transducer elements, and means for comparing the outputs in said channels.

3. Apparatus for determining the direction of a source of wave energy comprising a multi-section transducer having a direction sensitive lobe pattern the axis of which is normally perpendicular to the active face of said transducer, circuit means grouping the elements of each transducer section, phase shifting means including lag and lead sections connected in circuit with each transducer group, means combining an output through a lead section of a first group with an output through a lag section of a second group to produce one output quantity corresponding to a shift in the axis of said pattern to one side of said perpendicular, means combining an output through a lag section of said first group with an output through a lead section of said second group to produce another output quantity corresponding to a shift in the axis of said pattern to the other side of said perpendicular, said shifted patterns being overlapped, and means for comparing said output quantities.

4. Apparatus for determining the direction of a source of wave energy comprising first and second similar transducers disposed closely adjacent each other and having their active faces coplanar, the directivity pattern of said transducers when combined directly having a major lobe the axis of which is perpendicular to the transducer faces, phase shifting means including lag and lead sections connected in circuit with the output from each said transducer, means combining an output through a lead section connected to said first transducer with an output through a lag section connected to said second transducer to produce an output quantity corresponding to a shift in the axis of said pattern to one side of said perpendicular, means combining an output through a lag section connected to said first transducer with an output through a lead section of said second transducer to produce another output quantity corresponding to a shift in the axis of said pattern to the other side of said perpendicular, said shifted patterns being overlapped, and means for comparing said output quantities.

5. Apparatus for determining the direction of a source of wave energy comprising a transducer having its active face divided into first and second equal parts, said transducer parts when combined directly having a direction sensitive pattern the main lobe of which has an axis perpendicular to the transducer face, phase shifting means including lag and lead sections connected in circuit with the output from each transducer part, means combining an output through a lead section connected to said first transducer part with an output through a lag section connected to said second transducer part to produce an output quantity corresponding to a shift in the axis of said lobe to one side of said perpendicular, means combining an output through a lag section connected to said first transducer part with an output through a lead section connected to said second transducer part to produce another output quantity corresponding to a shift in the axis of said lobe to the other side of said perpendicular, said shifted lobes being overlapped, and means for comparing said output quantities.

MALCOLM H. HEBB.

REFERENCES CITED

The following references are of record in the file of this patent:

UNITED STATES PATENTS

| Number | Name | Date |
| --- | --- | --- |
| 2,069,208 | Batchelder | Feb. 2, 1937 |
| 2,166,991 | Guanella | July 25, 1939 |
| 2,251,708 | Hefele | Aug. 5, 1941 |